Patented Aug. 14, 1945

2,382,119

UNITED STATES PATENT OFFICE 2,382,119

PROCESS FOR EXTRACTION OF HYDROCARBONS

Charles E. Welling, Bartlesville, Okla., assignor to Phillips Petroleum Company, a corporation of Delaware No Drawing. Application September 5, 1942, Serial No. 457,473

3 Claims. (Cl. 260—681.5)

My invention relates to an improved process for separating the components of a hydrocarbon mixture. More particularly, it relates to a method of concentrating conjugated diolefins. Still more particularly, this invention relates to a process of liquid-liquid extraction in which a hydrocarbon mixture containing aliphatic or alicyclic paraffins or olefins and alicyclic or aliphatic diolefins, usually conjugated, generally close-boiling and generally of the same number of carbon atoms as the olefin, is contacted with a suitable selective solvent in order to separate said hydrocarbon mixture into fractions of unlike composition or properties. Still more particularly it relates to such a process wherein the hydrocarbon stream being extracted consists of aliphatic or alicyclic mono-olefins and aliphatic or alicyclic conjugated diolefins both of which have at least four and not more than seven carbon atoms in the molecule. Still more specifically it relates to the separation of aliphatic conjugated pentadienes, especially isoprene, from close-boiling pentenes, especially low-boiling pentene-2, and of butadiene from butene-1. However, it may equally be applied to the separation of cyclopentadiene or piperylene from cyclopentene.

In another aspect the invention relates to an improved method of separating mono-olefins from close boiling diolefins by a novel series of steps comprising selective solvent extraction using a low-boiling selective solvent which preferentially dissolves the diolefin and which also forms a constant-boiling mixture or azeotrope with the mono-olefin, which azeotrope boils well below the diolefin or azeotrope with the diolefin, and fractional distillation of the extract phase enriched in diolefin but also carrying some mono-olefin to remove the mono-olefin overhead in the form of an azeotrope with the entraining agent. In this way the overall separation of diolefin from mono-olefin is greatly enhanced without requiring the excessive consumption of heat in the fractionating column and fractional distillation load that would be entailed were the entire original feed passed directly to an azeotropic distillation step. If desired, the raffinate from the extraction zone may similarly be subjected to such a azeotropic distillation step.

By "close-boiling" as used herein, I mean so close in boiling point as to make separation by simple fractional distillation impossible or uneconomical because requiring an excessive number of plates. This term denotes hydrocarbons boiling within three degrees and usually within two degrees of one another.

At the present time there are various processes, such as thermal cracking and catalytic dehydrogenation, that are employed for treating hydrocarbons to yield as products mixtures of one or more diolefins together with other hydrocarbons, such as olefins. It is of considerable importance to recover the diolefins from such mixtures in a practical and economical manner. The commonest method of separating hydrocarbon mixtures is by fractional distillation, but great difficulties are frequently encountered when this method is applied to the separation of olefin and diolefin mixtures. For example, the boiling point interval at atmospheric pressure between butadiene and butene-1 is only about 1.8° C., and about an equally small temperature interval separates the boiling points of isoprene and the low-boiling isomer of pentene-2. Because of such small boiling point differences, it is obviously difficult if not impossible to separate by fractional distillation certain hydrocarbon mixtures that contain diolefins together with close-boiling hydrocarbons of other types.

It is known to employ certain selective solvents to treat liquid hydrocarbon mixtures in order to effect more or less complete separation of the different types of hydrocarbons contained therein. Thus, selective solvents such as "Chlorex" (2,2'-dichloroethyl ether), nitrobenzene, phenol, furfural, and dimethyl formamide have been used in the selective extraction of lubricating oil stocks in order to extract naphthenic and aromatic types of hydrocarbons and to produce as raffinate lubricating oils of highly paraffinic character. It is further known to employ selective extraction to recover a mixture of olefins and diolefins from cracked gasolines or refinery gases. It also has been proposed to separate olefins and diolefins contained in liquefied normally gaseous hydrocarbon mixtures by liquid-liquid extraction.

However, there is a serious difficulty encountered in practicing liquid-liquid selective extraction of olefin-diolefin mixtures, particularly when the hydrocarbon mixture is composed of hydrocarbons having not more than seven carbon atoms per molecule. In general, the intersolubility of the lighter olefins and diolefins with the usual selective solvents is so great that it is necessary to resort to reduced temperatures in order to maintain two liquid phases. It is, of course, necessary for liquid-liquid extraction that two liquid phases exist and that the extraction system be maintained at a temperature below the miscibility temperature for the hydrocarbon mixture and the solvent. In order to operate at temperatures below the miscibility temperature of mixtures comprising three and four carbon atom hydrocarbons, it has been proposed to operate an extraction process at temperatures as low as −60° F. However, the excessive refrigeration costs involved have prevented commercial utilization of such a process.

The principal object of my invention is to provide an improved process for the separation of a liquid or liquefied mixture of olefins and diolefins by selective extraction with a selective solvent. It is a further object of my invention to provide a process for the separation of a liquid mixture of olefins and diolefins by selective extraction with a solvent at temperatures higher than those that it has heretofore been possible to employ. Another object of my invention is to provide a process for the separation of close-boiling mixtures of olefin and diolefin hydrocarbons that boil within or below the boiling range of gasoline, by selective extraction with a selective solvent. It is another object of my invention to provide a process for the selective extraction of mixtures of olefins and diolefins whereby a group of materials that have heretofore been considered unsuitable for use as selective solvents may be advantageously used. Still another object of my invention is to provide a process for the selective extraction of mixtures of olefins and diolefins at temperatures that are commercially feasible while employing as selective solvent some one of the group of materials that are suitable for use as entraining agents in the separation by azeotropic distillation of close-boiling mixtures of olefin and diolefin hydrocarbons. It is a further object of my invention to provide a process whereby a mixture of close-boiling olefins and diolefins are subjected to selective extraction at a temperature above that which might be employed in known processes, followed by azeotropic fractionation of extract or raffinate, or both, with the same material employed both as selective solvent in the extraction and as entraining agent in the azeotropic fractionation. Other objects will become apparent from the following description of my invention.

I have now found that an extraction of a mixture of olefins and diolefins with a selective solvent may be practiced in a higher and more convenient temperature range if the mixture of hydrocarbons to be extracted is first diluted with a high-boiling, preferably paraffinic type, oil that is free from double bonds and has low solubility in the selective solvent employed. The solution thus obtained is contacted with the selective solvent to extract the diolefin preferentially. In this manner I have succeeded in carrying out extractions at or near room temperature, whereas considerably lower temperatures would have been necessary in order to attain the same result by known methods.

The diluent employed according to my process may be a mineral seal oil or refined white mineral oil or some similar material preferably essentially paraffinic in nature. The diluent may consist either of a single compound or may be a mixture. The diluent must possess a boiling point considerably higher than the boiling points of the principal components of the hydrocarbon mixture to be extracted so that it is readily separated therefrom by stripping or fractional distillation. Ordinarily its boiling point is so high that it may be readily separated from the solvent in the same manner. In general the diluent is a high-boiling hydrocarbon oil consisting essentially of paraffin hydrocarbons ranging upwardly from decane. Its initial boiling point is at least 175° C. and usually 215° C. or higher and the average molecular weight is usually at least 200. While a paraffinic oil of the nature of mineral seal oil or white mineral oil such as that known as "Nujol" is preferred, I may use a somewhat lower boiling essentially paraffinic material such as kerosene which is substantially free from aromatic components and has an initial boiling point of at least about 175° C. preferably the diluent is substantially insoluble in the selective solvent and does not form an azeotrope therewith.

Known methods and equipment may be employed in effecting the liquid-liquid contacting of the selective solvent with the mixture of olefin, diolefin, and diluent. Thus, in practicing my invention, I may employ contacting means such as mixers and settlers or packed or unpacked towers through which the selective solvent and mixture being extracted are passed, either concurrently or, preferably, countercurrently.

The pressure at which it will be necessary to work, in practicing my invention, will depend upon the hydrocarbon mixture to be treated, the selective solvent chosen, and the temperature at which the process is operated. In any event, the pressure should be sufficient to maintain the materials in the liquid phase.

The temperature at which the liquid-liquid contacting according to my process is carried out will vary, depending upon the composition of the hydrocarbon mixture to be separated, the amount of high-boiling diluent that is added to the hydrocarbon mixture, the particular solvent employed, and the ratio of solvent volume to volume of the hydrocarbon mixture before addition of diluent. Usually the temperature will range from about 0° C. to about room temperature, though it may be higher than room temperature up to just below the temperature of miscibility. My process differs from known methods in that by the addition of a suitable diluent to the hydrocarbon mixture I am able to operate my process at a temperature level above the minimum temperature at which complete miscibility of the hydrocarbon mixture and the solvent would occur if the solvent and the hydrocarbon mixture were to be brought together in the same ratio as that employed in the extraction according to my process. The maximum temperature at which my process may be operated will lie below the critical solution temperature of the mixture of solvent, hydrocarbon mixture, and added diluent. The exact value of this maximum temperature for operation is dependent upon the amount and character of high-boiling diluent that is added to the mixture of olefin and diolefin hydrocarbons, but it can be readily determined by trial for any particular case.

I may utilize known procedures in handling the extract and raffinate phases resulting from practicing my process. In general it will be necessary to treat the raffinate phase in such a manner as to remove any suspended or dissolved solvent and also to effect a separation of high-boiling diluent from the raffinate; the high-boiling diluent may then, of course, be recycled to the extraction unit. Depending upon the particular solvent, such methods of separating the dissolved solvent from the hydrocarbon mixture as water-washing or fractionation may be used. Similar methods of separation may be employed in treating the extract phase to recover the solvent and any high-boiling diluent, which may be recycled to appropriate points in the extraction unit, and the diolefin-rich hydrocarbons recovered from the extract phase may be withdrawn as a product of the process.

It is generally possible and convenient so to choose the solvent and the high-boiling diluent in any specific case that a considerable difference in boiling points of solvent and diluent exists, in order to facilitate the separation of solvent and diluent from the extract and raffinate phases by fractional distillation. However, if it is desired, it is possible to employ a solvent and high-boiling diluent of the same or nearly the same boiling range since, in general, methods of separation other than conventional fractional distillation are available, such as cooling and separation of phases, water washing, steam distillation, and the like.

The selection of suitable relative proportions of high-boiling diluent to the mixture of hydrocarbon to be separated will be well within the skill of the art in the light of this disclosure. These proportions may vary over a wide range but will frequently involve about equal amounts by volume of the hydrocarbon mixture, i. e. the olefin-diolefin mixture, and the diluent. Usually the amount of the diluent will be within the range of from about 50% to about 200% by volume based on the volume of hydrocarbon mixture.

Likewise the selection of extraction conditions of pressure, temperature, selective solvent, employed, diluent employed, and ratio of solvent volume to the volume of hydrocarbon mixture and consequently to the volume of the hydrocarbon mixture plus high-boiling diluent are matters well within the skill of workers in the art in the light of the teaching herein. It will be obvious that all of the factors and variables involved are largely inter-related with each other and that when one condition is changed adjustment of one or more others frequently is necessary. The relative proportions of solvent and low-boiling hydrocarbon mixture may vary widely, depending upon the concentration of diolefin in said mixture and upon other factors as well. Ordinarily I use the solvent in an amount ranging from 25% to 300% by volume based on the volume of said mixture.

As will be obvious, the concentration of diolefin to be extracted in the hydrocarbon mixture being treated will vary within extremely wide limits say from about 1% to about 50% by volume. As the selective solvent I prefer to use any known organic solvent which is essentially immiscible with or a non-solvent of paraffins and which dissolves diolefins preferentially with respect to mono-olefins or paraffins. Examples of typical solvents are: the n, n-substituted dialkyl fatty acid amides such as dimethyl formamide, diethyl formamide, etc., aldehydes such as benzaldehyde, furfural, etc., nitrobenzene, aniline, furfuryl alcohol, furfuryl amine, "Chlorex," phenols such as phenol (preferably in admixture with water), cresol, cresylic acid, resorcinol, etc., ethylene chlorohydrin, esters such as benzyl acetate, phenol acetate, methyl furoate, etc.

In general the solvent should be inert and form no compound or addition product with the other components present. Liquefied sulfur dioxide is generally unsatisfactory because of its marked tendency to combine with the diolefins to form a monosulfone addition compound. However, if conditions preventing or inhibiting this formation are employed or if formation of the monosulfone is not objectionable, liquid sulfur dioxide may be employed as the selective solvent.

The selective solvents just enumerated are with the exception of sulfur dioxide relatively high-boiling, that is, boiling at from 100 to 250° C. at atmospheric pressure which it is preferable to employ for extraction with such solvents.

As will be obvious, the high-boiling paraffinic diluent remains in the raffinate phase.

In certain cases I have found it desirable to employ as the selective solvent a material chosen from a group consisting of water-soluble low-boiling compounds of carbon, hydrogen, and oxygen boiling between 20 and 65° C. that I have found to be desirable entraining agents for the azeotropic fractionation of close-boiling mixtures of the lower olefins and diolefins and also satisfactorily selective for diolefins as against mono-olefins or paraffins. This group of compounds consists of acetaldehyde, propionaldehyde, propylene oxide (1, 2), methyl formate, and methyl alcohol. By the use of a compound chosen from this group as a selective solvent in an extraction process according to my invention, followed by azeotropic fractionation of either the extract or raffinate or both with the same compound as an entraining agent, I have found it possible to obtain excellent separations of olefin-diolefin mixtures while realizing simplifications and economies in design and operation. For example, by my process it is possible to employ compounds from this group as selective solvents for the extraction of mixtures of olefins and diolefins containing from four to about seven carbon atoms per molecule at temperature levels easily and inexpensively attained, whereas conventional extractions with the same compounds as solvents and the same hydrocarbon mixtures as charges would necessarily have to be practiced at undesirably low temperatures on account of the high mutual solubility of the solvents and the hydrocarbons involved.

The group of selective solvent-entraining agents enumerated in the preceding paragraph have in common the properties that they are good selective solvents for diolefins and are good entraining agents, that is with hydrocarbons they form azeotropes boiling at progressively higher temperature with increasing degree of unsaturation so that the azeotrope with paraffins comes overhead before that with olefins or diolefins and the azeotrope with mono-olefins boils markedly lower than that with diolefins, with the result that ready separation by fractional distillation is effected. In addition, they are sufficiently water-soluble that they can be readily separated from hydrocarbons by water-washing, which is a necessity in commercial operation. Furthermore they are the only compounds that I have found to meet these requirements in an exhaustive series of tests. In addition they are all organic compounds containing only carbon, hydrogen and oxygen and boiling between 20 and 65° C. They comprise the $C_2$ and $C_3$ saturated aliphatic aldehydes (formaldehyde is wholly unsatisfactory), the lowest saturated aliphatic alcohol, the lowest alkyl ester of the lowest fatty acid, and the lowest alkyl substituted derivative of the simplest alkylene oxide. Thus, the five compounds set forth form a natural grouping meeting certain peculiar requisites and having a community of physical and chemical properties.

In proceeding in accordance with the embodiment just described, the extraction step itself may be conducted in the same manner described above when using the high-boiling solvents. Following the extraction the extract and the raffinate phases are separated from one another in the conventional manner. Either or both is then fractionally distilled to separate as an overhead the lowest-boiling azeotrope. If the amount of selective solvent in the feed to the distillation step is insufficient to form an azeotrope with all of the less saturated component of the phase, I may introduce sufficient entraining agent, usually identical with the selective solvent already present, to make up this deficiency. It is usually preferred, however, to use enough of the selective solvent in question in the extraction step to function as the entraining agent for all the hydrocarbons sought to be separated in the subsequent azeotropic distillation of at least the extract phase and, if desired, the raffinate phase as well.

Upon fractional distillation of the extract, which is enriched in diolefins, the lowest boiling fraction is the azeotrope with any low-boiling ($C_4$ to $C_7$) paraffin present, and the next fraction is the azeotrope with any monoolefin present. The next fraction may be the azeotrope with the diolefin. Or depending on the amount of entrainer present and the wishes of the operator, the diolefin may simply form the kettle product, or be partially removed as a side-stream or overhead, the balance being removed as kettle product. Obviously the fractions referred to may be taken off either as successive overhead fractions or as a plurality of sidestreams.

Likewise, upon fractional distillation of the raffinate, the fractions recovered will depend on the composition of the raffinate, on whether or not additional entrainer is added, and on the wishes of the operator. In most cases the raffinate will contain substantial amounts of dissolved selective solvent which will form azeotropes with any low-boiling paraffin present, any mono-olefin present, and any diolefin present, and these will come over in the order named until all of the azeotropes have been removed. The solvent will not ordinarily form an azeotrope with the high-boiling paraffinic diluent employed and may be separated therefrom by simple distillation. Or the solvent and diluent may be simply not separated and may be recycled as such to contact with the olefin-diolefin mixture to be extracted. Ordinarily the amount of solvent dissolved in the raffinate phase will be fairly small.

When in the distillation of the raffinate, the amount of solvent present to act as entraining agent is insufficient to form azeotropes with the light hydrocarbons present, these may be removed by simple distillation or stripping after any azeotrope or azeotropes have been driven off. Thus, any residual paraffin, mono-olefin, or diolefin and mixtures thereof are readily removed but such mixtures are not recoverable as separate fractions. As will be obvious from the foregoing, it is ordinarily preferred to finally resolve the several azeotropes obtained by the distillation of the extract phase and/or the raffinate phase by water washing which dissolves the solvent away from the purified more or less concentrated hydrocarbon.

It is possible to operate in such manner that the raffinate is entirely free of diolefin or that the extract is entirely free of mono-olefin, as will be obvious to those skilled in the art. In such case the other phase will ordinarily contain a higher proportion of the component other than the one sought to be concentrated therein.

While in the foregoing detailed description, there is described a method wherein the low-boiling hydrocarbons to be resolved are dissolved in the high-boiling diluent prior to contacting, I need not proceed in this way but may instead contact the three materials—hydrocarbon mixture, high-boiling diluent and selective solvent—with one another in any way, by which the desired equilibrium is obtained. Thus, I may contact the hydrocarbon mixture with a preformed mixture of the diluent and solvent, or introduce the diluent to an agitated mixture of the low-boiling hydrocarbons and the selective solvent.

Although the process of my invention is applicable to the separation of a wide range of olefin-diolefin mixtures, it is particularly applicable to the separation of such mixtures containing hydrocarbons having from four to seven carbon atoms per molecule. It is of particular value in separating close-boiling mixtures of olefins and diolefins. My process is also applicable to the separation of cyclic olefins from diolefins and to the separation of paraffins from diolefins.

My invention may be further illustrated and described by the following specific examples.

*Example I*

In preliminary experiments it was found that at room temperature pentene-2 ($n_D^{20}$—1.3793) and isoprene ($n_D^{20}$ 1.4210) were each completely miscible with dimethylformamide when one volume of hydrocarbon was contacted with about an equal volume of dimethylformamide. A single batchwise liquid-liquid extraction was then carried out at room temperature, whereby 35 volumes of a mixture of pentene-2 and isoprene in about equal volumes together with 35 volumes of a white mineral oil was shaken with 35 volumes of dimethylformamide. After separation of solvent (or extract) and hydrocarbon (or raffinate) phases, each phase was freed of solvent by water-washing, and the olefin and diolefin hydrocarbons were recovered from the water-insoluble residues by distillation. The results obtained in this extraction are summarized as follows:

| Material | Volumes | $n_D^{20}$ | Isoprene by $n_D^{20}$ |
|---|---|---|---|
| | | | Percent |
| Light hydrocarbon charge | 35.0 | 1.3994 | 48.2 |
| Light hydrocarbons from solvent (extract) phase | 10.4 | 1.4035 | 58.0 |
| Light hydrocarbons from hydrocarbon (raffinate) phase | 19.0 | 1.3970 | 42.4 |
| Light hydrocarbon loss | 5.6 | | |

It is readily seen from these data that a very considerable separation of isoprene from the original mixture of isoprene and pentene-2 was effected by this single extraction with dimethylformamide as the selective solvent. Furthermore, the extraction was carried out at a temperature such that no cooling or refrigeration was required. As shown by the preliminary experiments, it would not have been possible to have performed the extraction at this temperature by the use of known methods of operation. From this example the great practical value of my process is readily perceived. A much more complete separation of olefin and diolefin would have been effected by repeated extractions or by continuous counter-current operation.

*Example II*

In preliminary experiments it was found that both pentene-2 and isoprene were completely miscible with acetaldehyde down to about −75° C.

A single batchwise liquid-liquid extraction of a mixture of these hydrocarbons was then carried out according to this invention at the temperature of melting ice with acetaldehyde as the selective solvent. The mixture of pentene-2 and isoprene consisted of about 50 volume per cent pentene-2 ($n_D^{20}$ 1.3794) and 50 volume per cent of an isoprene concentrate ($n_D^{20}$ 1.4202) that contained about 96.5 per cent isoprene; the refractive index of the mixture was 1.3999, corresponding to a calculated isoprene content of 48.6 per cent, assuming the refractive index of pure isoprene to be 1.4216.

In the extraction, a mixture of 25 volumes of the olefin-diolefin mixture plus 25 volumes of a high boiling white mineral oil was contacted with 25 volumes of acetaldehyde. After separation of solvent and hydrocarbon phases, the upper or solvent phase was washed free of acetaldehyde with water, and the olefin-diolefin mixture contained in the residue was separated from the residual mineral oil by distillation. The lower or raffinate phase was first distilled to separate acetaldehyde and the light hydrocarbons from the residual mineral oil, and then the light hydrocarbons were freed from acetaldehyde by water-washing. The results are summarized in the following tabulation.

| Material | Volumes | $n_D^{20}$ | Isoprene by $n_D^{20}$ |
|---|---|---|---|
| | | | Per cent |
| Light hydrocarbon charge | 25 | 1.3999 | 48.6 |
| Light hydrocarbons recovered from solvent (extract) phase | 10 | 1.4010 | 51.2 |
| Light hydrocarbons recovered from hydrocarbon (raffinate) phase | 11 | 1.3974 | 42.7 |
| Light hydrocarbons loss | 4 | | |

The loss of 4 volumes of light hydrocarbons was largely occasioned by their rather high volatility and by the opportunities afforded for vaporization during the various operations subsequent to the extraction proper. Losses from these causes would be greatly minimized by commercial scale operations in closed systems. The same is true with regard to the loss shown in Example I.

It is seen from the tabulation that the single stage of extraction effected a considerable separation of isoprene from pentene-2. This separation would be increased to any desired degree by further extractions. Of particular importance is the fact that by the addition of mineral oil the essential condition for such extraction, that is, the existence of two liquid phases, was maintained at a readily accessible temperature level much above the temperature level that would have been required in extraction by known methods.

From the foregoing, a great many advantages of my invention will be apparent to those skilled in the art. Among them are the fact that my invention makes possible the ready separation of diolefins from other hydrocarbons commonly encountered in admixture therewith, without the necessity of employing excessive and expensive amounts of refrigeration. In fact it enables the separation to be carried out at ordinary atmospheric temperature. It provides an improved method of recovering $C_4$ and $C_5$ diolefins from their respective streams. In the preferred modification using the combined solvent extraction and azeotropic distillation, the same low-boiling organic compound performing the dual functions of selective solvent and entraining agent, additional advantages are attained among which are the simplification of the combined steps, easier control, and better overall separation. Accordingly it will be seen that the process described herein is a very valuable contribution to the art of diolefin separation and concentration.

Because the invention may be practiced otherwise than as specifically shown herein, and because many modifications and variations of it will be apparent to those skilled in the art, it should not be restricted except as specifically indicated in the following claims.

I claim:

1. A process of concentrating a conjugated diolefin of from four to seven carbon atoms per molecule from a hydrocarbon mixture consisting of said diolefin and a close-boiling olefin of the same number of carbon atoms per molecule which comprises diluting said mixture with a high-boiling paraffinic oil free from double bonds and having an initial boiling point of at least 175° C. and an average molecular weight of at least 200, extracting the resulting diluted mixture with a selective solvent which is preferential for said diolefin, which solvent is inert towards the components of said diluted mixture, is substantially a non-solvent for said oil, is a water-soluble organic compound containing only carbon, hydrogen and oxygen, boils between 20 and 65° C., and forms with said olefin an azeotrope boiling sufficiently below the azeotrope which it forms with said diolefin to be readily separable therefrom by distillation, conducting said extraction with all components in the liquid phase and at a temperature which is below the critical solution temperature of the resulting mixture but above the temperature at which the same relative proportions of said hydrocarbon mixture and said solvent would be miscible in the absence of said high-boiling oil, thereby enriching said solvent with said diolefin, separating the extract phase, subjecting said separated extract phase to azeotropic fractional distillation employing the solvent contained therein as azeotropic entraining agent, and thereby effecting separation of the olefin content of the extract from the diolefin content thereof, said solvent being used in said extracting step in amount at least sufficient to form an azeotrope with all of the olefin content of said extract.

2. The process of claim 1 in which said diolefin is isoprene and said olefin is pentene-2.

3. The process of claim 1 in which said solvent is acetaldehyde.

CHARLES E. WELLING.